US010333361B2

United States Patent
Ishii et al.

(10) Patent No.: US 10,333,361 B2
(45) Date of Patent: Jun. 25, 2019

(54) DYNAMO-ELECTRIC MACHINE

(71) Applicant: MEIDENSHA CORPORATION, Tokyo (JP)

(72) Inventors: Ryota Ishii, Tokyo (JP); Takuya Kurasawa, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 15/755,788

(22) PCT Filed: Aug. 31, 2016

(86) PCT No.: PCT/JP2016/075378
§ 371 (c)(1),
(2) Date: Feb. 27, 2018

(87) PCT Pub. No.: WO2017/038837
PCT Pub. Date: Mar. 9, 2017

(65) Prior Publication Data
US 2019/0036396 A1    Jan. 31, 2019

(30) Foreign Application Priority Data
Aug. 31, 2015 (JP) .................. 2015-170842

(51) Int. Cl.
*H02K 1/24* (2006.01)
*H02K 1/26* (2006.01)
(Continued)

(52) U.S. Cl.
CPC .............. *H02K 1/24* (2013.01); *H02K 3/524* (2013.01); *H02K 2203/12* (2013.01)

(58) Field of Classification Search
CPC ............ H02K 1/24; H02K 1/26; H02K 3/524; H02K 3/52; H02K 3/18; H02K 2203/12
(Continued)

(56) References Cited

U.S. PATENT DOCUMENTS 894,015 A  *  7/1908  Nakamura ............. H02K 21/10
                                                   310/269
4,990,810 A  *  2/1991  Newhouse ............. H02K 3/527
                                                   310/179
(Continued)

FOREIGN PATENT DOCUMENTS

JP        54-028003 U    2/1979
JP        06-351203 A    12/1994
(Continued)

OTHER PUBLICATIONS

European Search Report, dated Nov. 7, 2018, 10 pages.

*Primary Examiner* — John K Kim
(74) *Attorney, Agent, or Firm* — Foley & Lardner LLP

(57) ABSTRACT

To provide a dynamo-electric machine with which it is possible to improve electrical characteristics by reducing the leakage magnetic flux and increasing the effective magnetic flux. In order to achieve this, a magnetic pole head (23) for restraining a field winding (24) is provided with restraining parts (31) for restraining only the coil end (24b) of the field winding (24). The restraining parts (31) are positioned further axially outside or inside than both axial end surfaces (11a) of a stator core (11). The restraining parts (31) have formed thereon: an inclined surface (31a) positioned further radially inside than the radially outside end surface (23a), of the magnetic pole head (23), which radially faces the inner circumferential surface (11b) of the stator core (11); and a step (31b) for linking the radially outside end surface (23a) and the inclined surface (31a) in the radial direction.

8 Claims, 7 Drawing Sheets

(51) Int. Cl.
  *H02K 3/18*    (2006.01)
  *H02K 3/52*    (2006.01)
(58) Field of Classification Search
  USPC .................................................. 310/46, 269
  See application file for complete search history.

(56) References Cited

U.S. PATENT DOCUMENTS

| | | | | |
|---|---|---|---|---|
| 9,077,223 | B2* | 7/2015 | Imura | ....................... H02K 1/24 |
| 2014/0028141 | A1* | 1/2014 | DuVal | ....................... H02K 3/20 |
| | | | | 310/183 |
| 2014/0333174 | A1* | 11/2014 | Imura | ....................... H02K 1/24 |
| | | | | 310/216.113 |

FOREIGN PATENT DOCUMENTS

| | | |
|---|---|---|
| JP | 07-075267 A | 3/1995 |
| JP | 2014-220963 A | 11/2014 |

* cited by examiner

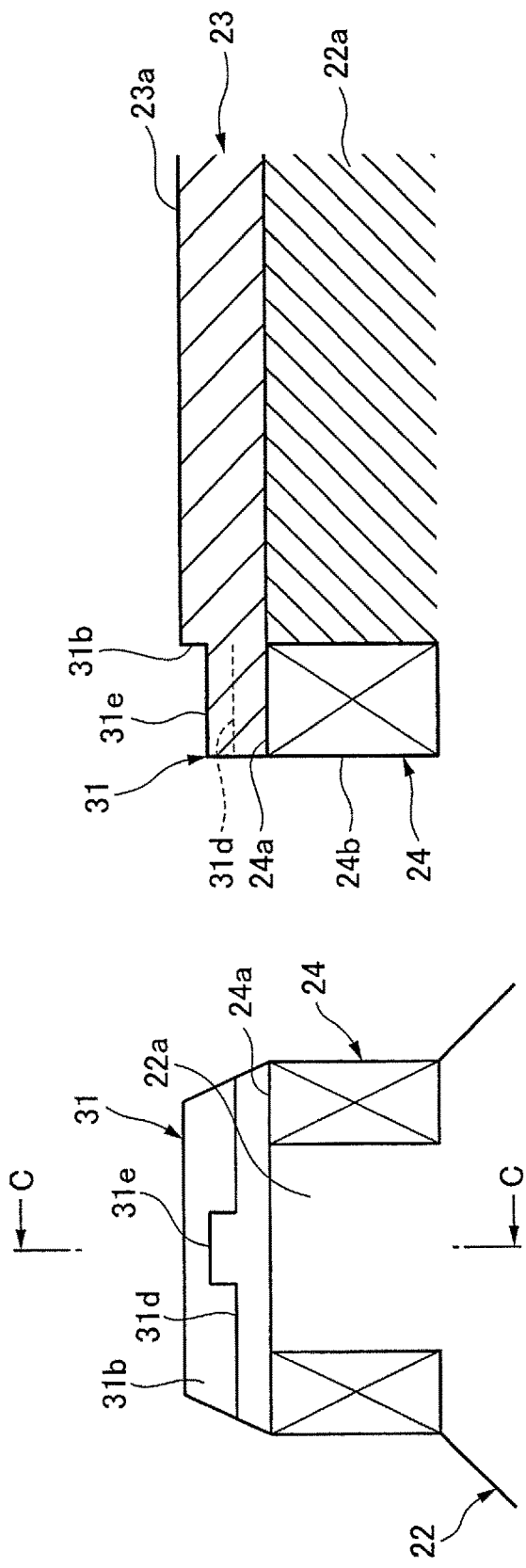

DYNAMO-ELECTRIC MACHINE

TECHNICAL FIELD

The present invention relates to a dynamo-electric machine in which the coil ends of the field windings are restrained by the magnetic pole heads.

BACKGROUND ART

Among dynamo-electric machines conventionally provided is a dynamo-electric machine including a salient pole rotor structure. In such a salient pole rotor structure, multiple protrusions protruding radially outward are arranged at the outer circumferential portion of the magnetic pole core constituting the center portion of the rotor, along the circumferential direction, and a field winding is wound around each protrusion.

In this case, provided on the top surface of the protrusion is a magnetic pole head, which is adapted to restrain the field winding wound around the protrusion. This prevents the field winding from deviating from the protrusion due to centrifugal force by the rotation of the rotor.

Conventional dynamo-electric machines as described above are disclosed, for example, in Patent Documents 1 and 2.

PRIOR ART DOCUMENT

Patent Document

Patent Document 1: Japanese Patent Application Publication No. Hei 6-351203
Patent Document 2: Japanese Patent Application Publication No. Hei 7-75267

SUMMARY OF THE INVENTION

Problems to be Solved by the Invention

Here, if the magnetic pole head is designed to restrain the wound field winding including the coil ends as a conventional dynamo-electric machine described above does, the axial length of the magnetic pole head would be relatively long, and in some cases, the axial length of the magnetic pole head would be longer than the axial length of the stator core radially facing the magnetic pole head. In other words, both axial ends of the magnetic pole head would be positioned axially outside of both axial end surfaces of the stator core.

When excitation current flows in the field winding, magnetic flux is generated inside the field winding. This magnetic flux passes through the inside of the protrusion and the inside of the magnetic pole head, and heads toward the inner circumferential surface of the stator core. In this case, if both axial ends of the magnetic pole head are positioned axially outside of both axial end surfaces of the stator core as described above, both axial ends of the magnetic pole head do not radially face the inner circumferential surface of the stator core, so that the magnetic flux having passed through both the axial ends heads toward portions other than the inner circumferential surface of the stator core.

Such magnetic flux heading toward portions other than the inner circumferential surface of the stator core, which is called leakage magnetic flux, flows toward, for example, both axial end surfaces of the stator core and the surrounding structures of the stator core. If the leakage magnetic flux is large, it increases eddy current loss, which may deteriorate electrical characteristics of the dynamo-electric machine.

Thus, the present invention is to solve the above problems, and an object thereof is to provide a dynamo-electric machine having improved electrical characteristics by decreasing the leakage magnetic flux and increasing the effective magnetic flux.

Means for Solving the Problems

To solve the above problems, a dynamo-electric machine according to a first aspect of the invention is characterized in that the dynamo-electric machine comprises:
  a cylindrical stator core;
  a magnetic pole core which is rotatably supported radially inside of the stator core, and on which a plurality of protrusions protruding radially outward are arranged along a circumferential direction;
  field windings each wound around a side peripheral surface of a corresponding one of the protrusions; and
  magnetic pole heads each of which is provided on a top surface of a corresponding one of the protrusions and is in contact with a winding-axis-direction outside end surface of a corresponding one of the field windings to restrain the field winding,
  each of the magnetic pole heads has restraining parts formed at both axial ends thereof, each of the restraining parts being in contact with the winding-axis-direction outside end surface at a coil end of the field winding to restrain the coil end, and
  the restraining parts are arranged axially outside of both axial end surfaces of the stator core, each of the restraining parts having
    an inclined surface which is arranged radially inside of a radially outside end surface of the magnetic pole head, the radially outside end surface axially facing an inner circumferential surface of the stator core, and which is gradually inclined radially inward as extending axially outward, and
    a step radially connecting an axially outside end of the radially outside end surface and an axially inside end of the inclined surface.

To solve the above problems, a dynamo-electric machine according to a second aspect of the invention is characterized in that the dynamo-electric machine comprises:
  a cylindrical stator core;
  a magnetic pole core which is rotatably supported radially inside of the stator core, and on which a plurality of protrusions protruding radially outward are arranged along a circumferential direction;
  field windings each wound around a side peripheral surface of a corresponding one of the protrusions; and
  magnetic pole heads each of which is provided on a top surface of a corresponding one of the protrusions and is in contact with a winding-axis-direction outside end surface of a corresponding one of the field windings to restrain the field winding,
  each of the magnetic pole heads has restraining parts formed at both axial ends thereof, each of the restraining parts being in contact with the winding-axis-direction outside end surface at a coil end of the field winding to restrain the coil end, and
  the restraining parts are arranged axially inside of both axial end surfaces of the stator core, each of the restraining parts having
    an inclined surface which is arranged radially inside of a radially outside end surface of the magnetic pole head, the radially outside end surface axially facing an inner circumferential surface of the stator core, and which is gradually inclined radially inward as extending axially outward, and a step radially connecting an axially outside end of the radially outside end surface and an axially inside end of the inclined surface.

To solve the above problems, a dynamo-electric machine according to a third aspect of the invention is characterized in that the protrusion and the magnetic pole head are separate members.

To solve the above problems, a dynamo-electric machine according to a fourth aspect of the invention is characterized in that the step is formed in an entire area in a width direction of the restraining part.

Effect of the Invention

Thus, according to the dynamo-electric machine according to the present invention, the restraining parts formed on the magnetic pole head at both axial ends are arranged axially outside or axially inside of both axial end surfaces of the stator core, and the inclined surface and the step are formed at this restraining part, which increases the radial distance between the inclined surface of the restraining part and the inner circumferential surface of the stator core, and thus increases the magnetic resistance between them. This makes it possible to decrease the leakage magnetic flux passing through the inclined surface of the restraining part while increasing the effective magnetic flux passing through the radially outside end surface of the magnetic pole head and heading toward the inner circumferential surface of the stator core. As a result, it is possible to improve the electrical characteristics.

BRIEF DESCRIPTION OF THE DRAWINGS

FIG. 6A is a front view of a restraining part on which a flat surface and a protruding surface are formed, and FIG. 6B is a cross-sectional view seen from arrows C-C in FIG. 6A.

MODE FOR CARRYING OUT THE INVENTION

Hereinafter, a dynamo-electric machine according to the present invention will be described in detail with reference to the drawings.

EXAMPLE

Figure 1:
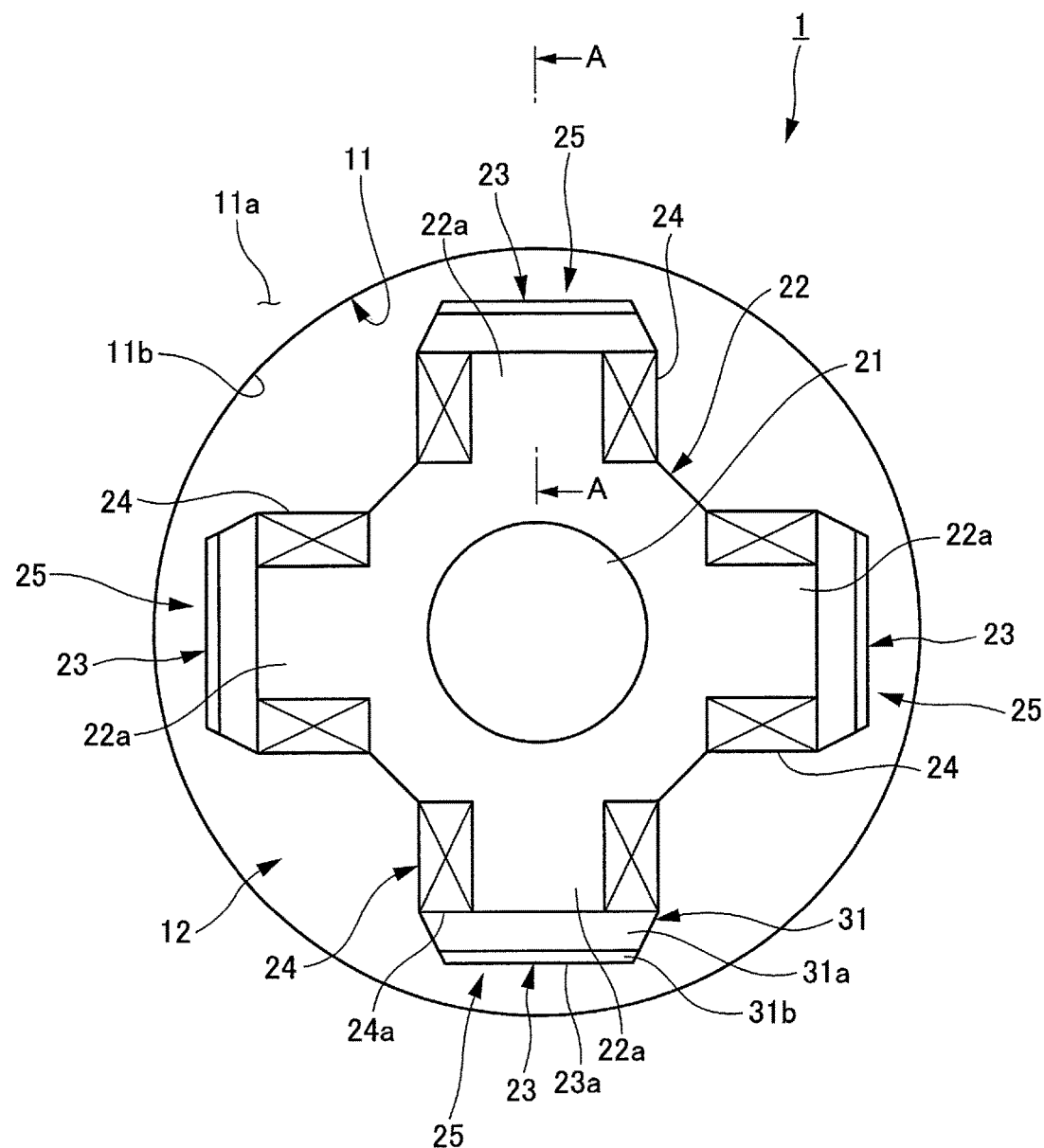
FIG. 1 is a front view of a dynamo-electric machine according to the present invention, seen from the axial direction.
Figure 2:
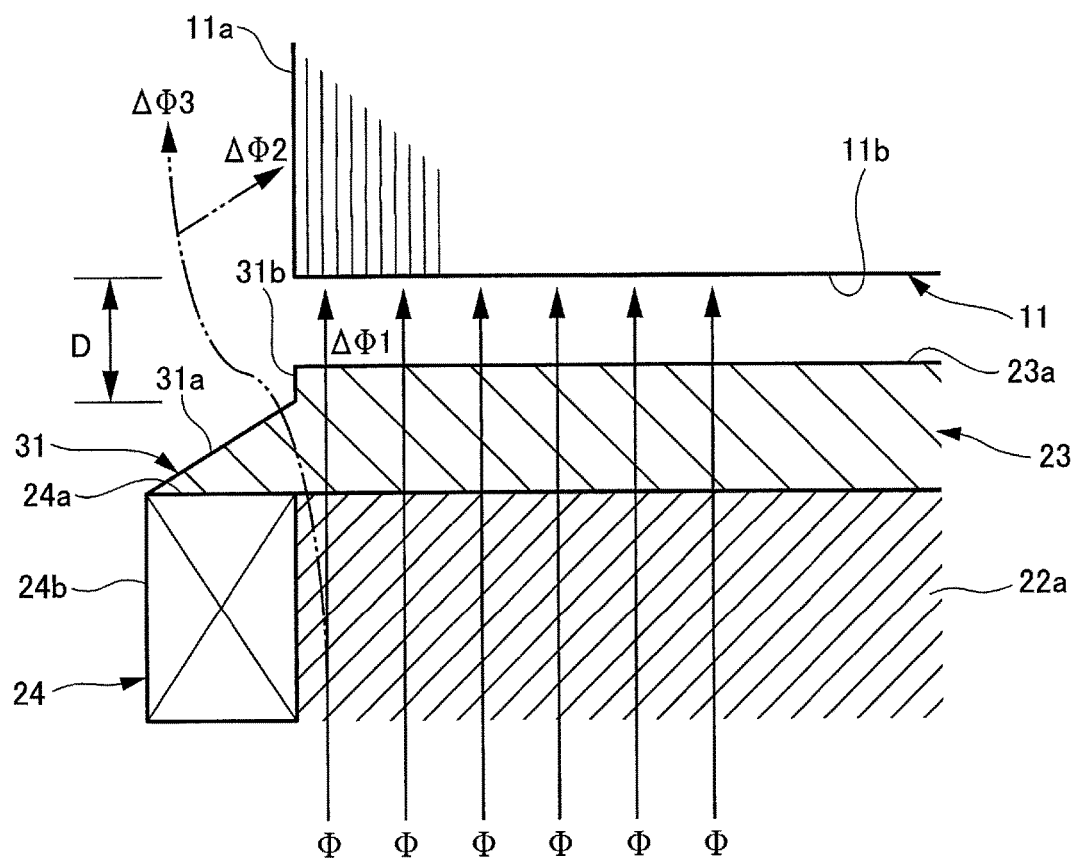
FIG. 2 is a cross-sectional view seen from arrows A-A in FIG. 1 and is a diagram illustrating a state of generation of leakage magnetic flux in the case where a restraining part of a magnetic pole head is arranged axially outside of the axial end surface of a stator core.

As illustrated in FIGS. 1 and 2, a dynamo-electric machine 1 of a salient pole type has a salient pole rotor 12 rotatably supported radially inside of a cylindrical stator core 11. Here, the stator core 11 is formed by punching a magnetic steel sheet (for example, an electromagnetic steel sheet), stacking the punched magnetic steel sheets in the axial direction, and integrating them. Meanwhile, the salient pole rotor 12 includes a rotary shaft 21, a magnetic pole core 22, magnetic pole heads 23, field windings (coils) 24, and other parts.

In other words, the salient pole rotor 12 rotates with the rotary shaft 21 as the center of rotation, and the rotary shaft 21 is fitted in the center hole of the magnetic pole core 22.

The magnetic pole core 22 is processed from a lump of magnetic material having no stack structure such that the lateral cross section thereof is substantially cross-shaped. In this way, on the outer circumferential portion of the magnetic pole core 22, multiple (four) protrusions 22a protrude radially outward and arranged at the same angular intervals in the circumferential direction. These protrusions 22a extend axially over the entire area of the magnetic pole core 22, and the axial length of the protrusions 22a is equal to the axial length of the stator core 11.

In addition, on the side peripheral surfaces of each protrusion 22a is wound the field winding 24. More specifically, coil ends 24b of the field winding 24 wound around the protrusion 22a are arranged axially outside of both axial end surfaces 11a of the stator core 11.

Meanwhile, the magnetic pole head 23 is fixed on a radially outside end surface (top surface) of the protrusion 22a using multiple bolts (not illustrated). This magnetic pole head 23 has a cross section and a longitudinal section, both in substantially trapezoidal shapes, and the radially outside end surface (top surface) 23a radially faces an inner circumferential surface 11b of the stator core 11. Here, the axial length of the magnetic pole head 23 is longer than the axial length of the stator core 11.

The side peripheral portions of the magnetic pole head 23 project outward beyond the side peripheral surfaces of the protrusion 22a, and the projected portions are in contact with winding-axis-direction outside end surfaces 24a of the field winding 24 so as to cover them from the radially outer side.

In other words, the magnetic pole head 23 restrains the field winding 24 wound around the protrusion 22a from the radially outer side toward the radially inner side. This prevents the field winding 24 from deviating from the protrusion 22a radially outward due to centrifugal force caused by the rotation of the salient pole rotor 12.

Here, the projecting portions, which are both axial ends of the magnetic pole head 23, form restraining parts 31 for restraining only the entire areas of the winding-axis-direction outside end surfaces 24a of the coil ends 24b of the field winding 24 wound around the protrusion 22a. These restraining parts 31 are arranged axially outside of both axial end surfaces 11a of the stator core 11 and formed over the entire areas of the magnetic pole head 23 in the width direction.

The radially outside end surface of the restraining part 31 forms an inclined surface 31a. This inclined surface 31a is gradually inclined radially inward as extending from the axial inside toward the axial outside, and does not radially face the inner circumferential surface 11b of the stator core 11.

In addition, the restraining part 31 is formed radially inside of the radially outside end surface 23a. In other words, the axially inner end of the inclined surface 31a and the axially outer end of the radially outside end surface 23a are connected via a step 31b, and the step direction of the step 31b is oriented in the same direction as the radial direction.

The inclined surface 31a and the step 31b, which are formed by cutting a radially outer portion of the restraining part 31, are formed over the entire area of the restraining part 31 (magnetic pole head 23) in the width direction. As described above, although details will be described later, the formation of the inclined surface 31a and the step 31b at the restraining part 31 not only decreases leakage magnetic flux and increases effective magnetic flux but also reduces the weight of the restraining part 31. This reduces the stress load to the bolts fixing the magnetic pole head 23 as much as the weight reduction of the restraining part 31 even though centrifugal force is applied to the magnetic pole head 23 by the rotation of the salient pole rotor 12.

Moreover, the formation of the step 31b reduces the inclination angle of the inclined surface 31a, and moves the inclined surface 31a radially inward away from the inner circumferential surface 11b of the stator core 11. In other words, this increases the radial distance D between the inclined surface 31a and the inner circumferential surface 11b. Note that the inclination angle of the inclined surface 31a is an inclination angle with respect to the axial direction, or specifically, an inclination angle with respect to the winding-axis-direction outside end surface 24a of the field winding 24 (coil end 24b) and the radially outside end surface (top surface) of the protrusion 22a.

As described above, the protrusion 22a of the magnetic pole core 22, the magnetic pole head 23, and the field winding 24 form a magnetic pole 25 as illustrated in FIG. 1, and excitation current flowing in the field winding 24 wound in a cylindrical shape generates a magnetic field inside the field winding 24. Then, utilizing repulsion force and attraction force between the magnetic field (rotating magnetic field) generated on the stator (stator core 11) side and the foregoing magnetic field generated on the salient pole rotor 12 side, the salient pole rotor 12 rotates relative to the stator core 11.

At this time, as illustrated in FIG. 2, the magnetic flux Φ in the magnetic field generated by the field winding 24 flows from the inside of the protrusion 22a via the inside of the magnetic pole head 23 toward the inner circumferential surface 11b of the stator core 11. In other words, the magnetic flux Φ forming the magnetic field passes inside the field winding 24 radially outward.

Figure 4:
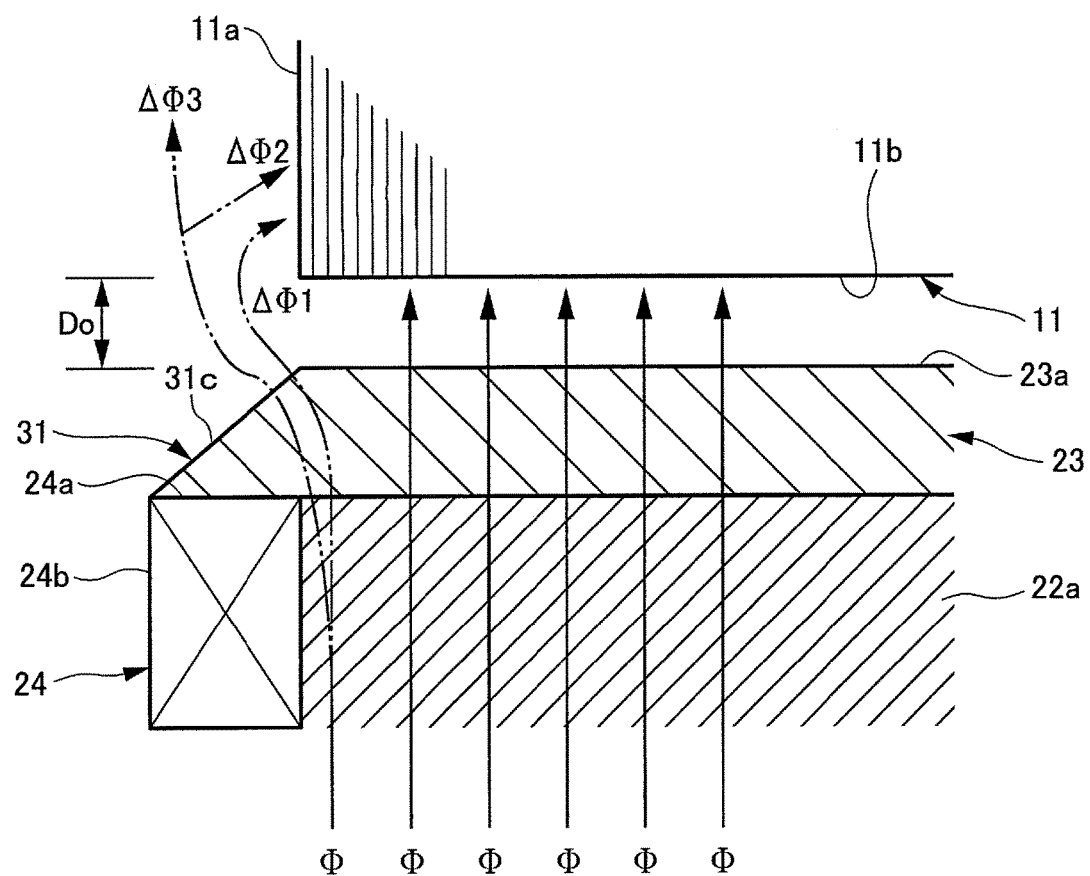
FIG. 4 is a cross-sectional view illustrating a state of generation of leakage magnetic flux in the case where an inclined surface is formed without forming a step at the restraining part of the magnetic pole head.

Here, as illustrated in FIG. 4, the flow of magnetic flux Φ in the case where the restraining part 31 does not include the step 31b will be described, for example. Specifically, the radially outside end surface of the restraining part 31 forms an inclined surface 31c. The inclined surface 31c is gradually inclined radially inward as extending from the axial inside toward the axial outside. The inclined surface 31c does not radially face the inner circumferential surface 11b of the stator core 11, but is directly connected to the radially outside end surface 23a not via the step 31b.

Thus, the radial distance Do between the inclined surface 31c and the inner circumferential surface 11b is equal to the radial distance between the radially outside end surface 23a and the inner circumferential surface 11b. As a result, the magnetic resistance between the inclined surface 31c and the inner circumferential surface 11b is substantially equal to the magnetic resistance between the radially outside end surface 23a and the inner circumferential surface 11b. With this, of the magnetic flux Φ generated by the field winding 24, in particular, the magnetic flux Φ passing through the axially outermost side (on the side closest to the restraining part 31) may pass through the inclined surface 31c as leakage magnetic flux Φ instead of passing through the radially outside end surface 23a.

In this way, the leakage magnetic flux Φ having passed through the restraining part 31 (inclined surface 31c), which does not radially face the inner circumferential surface 11b of the stator core 11, may, for example, branch into flows of the leakage magnetic flux ΔΦ1 to ΔΦ3, and flow toward an axial end surface 11a of the stator core 11, or flow toward other members other than the stator core 11. This generates eddy currents centered on the flows of the leakage magnetic flux ΔΦ1 to ΔΦ3, and especially increases eddy current loss in the axial end surface 11a in the stator core 11, and thus may decrease electrical characteristics of the dynamo-electric machine 1.

On the other hand, as illustrated in FIG. 2, using the step 31b to form the inclined surface 31a at the restraining part 31 reduces the inclination angle of the inclined surface 31a, and thus moves the inclined surface 31a radially inward away from the inner circumferential surface 11b of the stator core 11. In other words, the radial distance D between the inclined surface 31a and the inner circumferential surface 11b can be longer than the radial distance between the radially outside end surface 23a and the inner circumferential surface 11b. As a result, the magnetic resistance between the inclined surface 31a and the inner circumferential surface 11b can be larger than the magnetic resistance between the radially outside end surface 23a and the inner circumferential surface 11b.

With this, the leakage magnetic flux Φ having passed through the restraining part 31 (inclined surface 31c), which does not radially face the inner circumferential surface 11b of the stator core 11, is, for example, only the flows of the leakage magnetic flux ΔΦ2 and ΔΦ3, and the leakage magnetic flux ΔΦ1 can be prevented from flowing toward the axial end surface 11a.

Consequently, it is possible to reduce the eddy current loss in the axial end surface 11a of the stator core 11. In other words, it is possible to increase effective magnetic flux Φ (ΔΦ1) which passes through the radially outside end surface 23a of the magnetic pole head 23 and reaches the inner circumferential surface 11b of the stator core 11, and thus possible to improve electrical characteristics of the dynamo-electric machine 1.

Note that although the inclined surface 31a of the restraining part 31 is arranged axially outside of the axial end surface 11a of the stator core 11 in the foregoing embodiment, the inclined surface 31a may be arranged axially inside of the axial end surface 11a to radially face the inner circumferential surface 11b.

Figure 3:
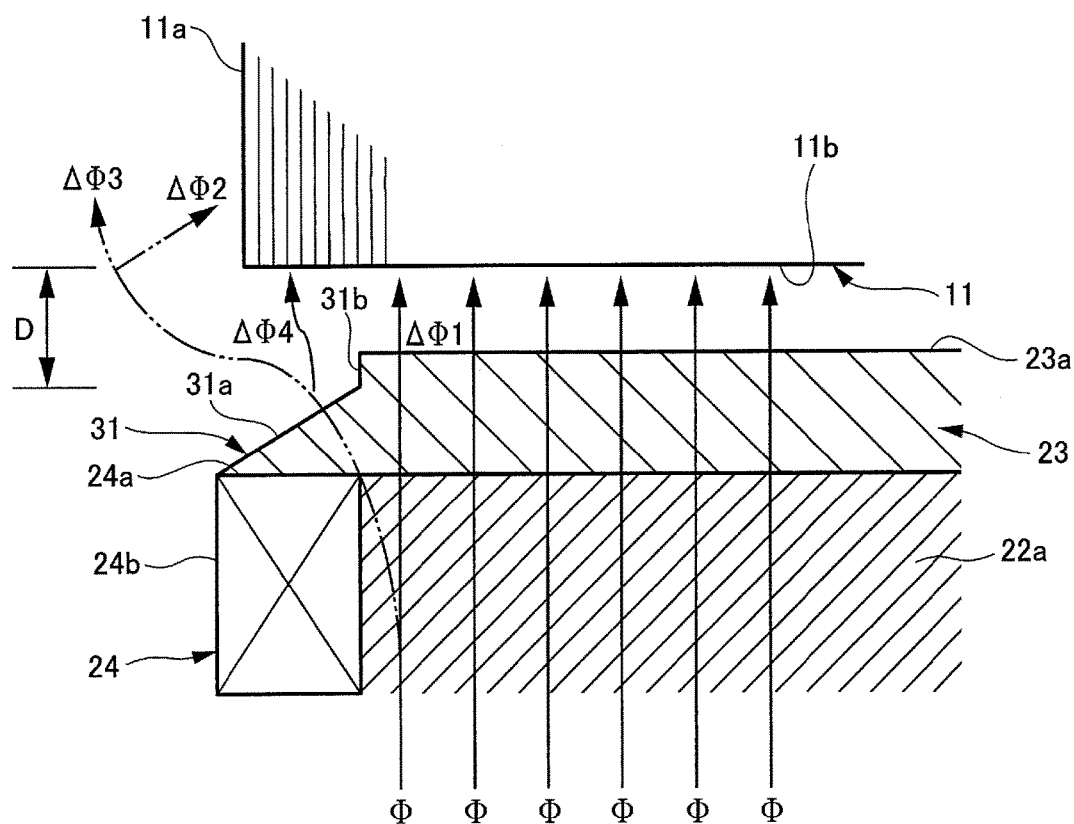
FIG. 3 is a cross-sectional view seen from arrows A-A in FIG. 1 and is a diagram illustrating a state of generation of leakage magnetic flux in the case where the restraining part of the magnetic pole head is arranged axially inside of the axial end surface of the stator core.

Specifically, as illustrated in FIG. 3, the magnetic pole core 22 is processed such that the axial length of the protrusion 22a is smaller than the axial length of the stator core 11. Then, the field winding 24 is wound around the side peripheral surfaces of each protrusion 22a, and the restraining part 31 restrains the coil ends 24b of the field winding 24. With this, the inclined surface 31a and the step 31b are arranged axially inside of the axial end surface 11a of the stator core 11, and radially face the inner circumferential surface 11b of the stator core 11.

Employment of the structure above allows leakage magnetic flux ΔΦ4, which is part of the leakage magnetic flux ΔΦ2 and ΔΦ3 having passed through the inclined surface 31a, to reach the inner circumferential surface 11b of the stator core 11 as effective magnetic flux Φ. Thus, the effective magnetic flux Φ (ΔΦ1, ΔΦ4) increases, which improves the electrical characteristics of the dynamo-electric machine 1.

Note that although the inclined surface 31a and the step 31b are formed at the restraining part 31 in the foregoing embodiment, the restraining part 31 only needs to have at least the step 31b for increasing the radial distance from the inner circumferential surface 11b, and the surface adjacent to the step 31b on the axially outer side may be a surface having a different form from the inclined surface 31a.

Figure 5A:
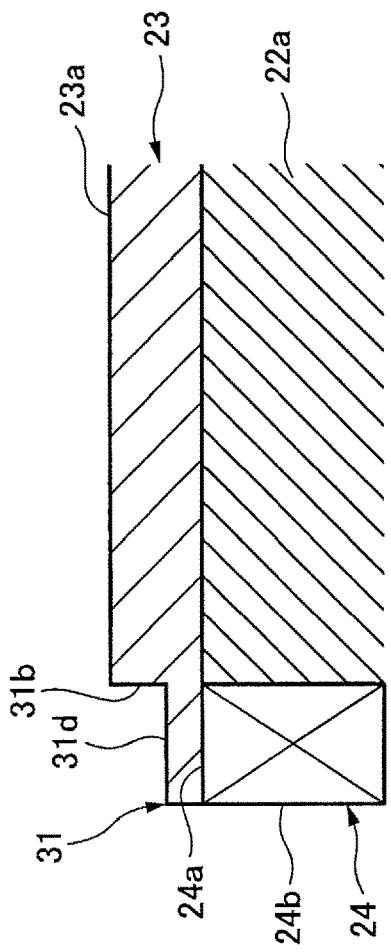
FIG. 5A is a front view of a restraining part on which a flat surface is formed.
Figure 5B:
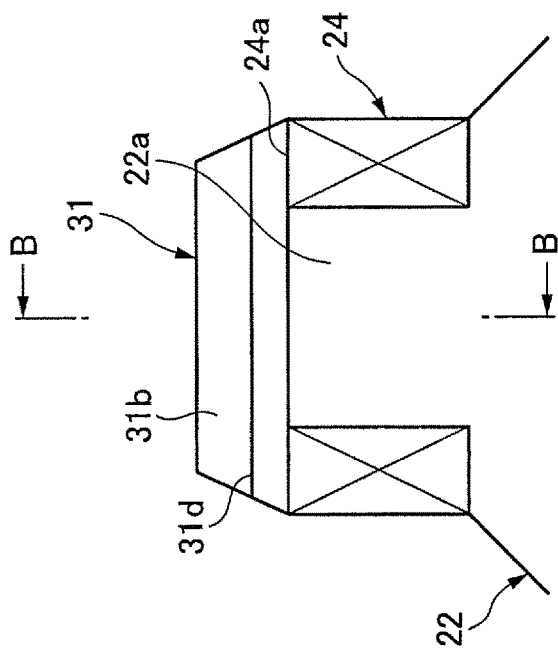
FIG. 5B is a cross-sectional view seen from arrows B-B in FIG. 5A.

For example, as illustrated in FIG. 5A and FIG. 5B, a flat surface 31d may be formed to be adjacent to the step 31b at the restraining part 31. This flat surface 31d is a surface orthogonal to the radial direction and extends in the width direction of the restraining part 31.

Alternatively, as illustrated in FIG. 6A and FIG. 6B, a flat surface 31d and a protruding surface 31e may be formed to be adjacent to the step 31b at the restraining part 31. This protruding surface 31e is a surface orthogonal to the radial direction and is arranged radially outside of the flat surface 31d and at the center of the flat surface 31d in the width direction.

Figure 7B:
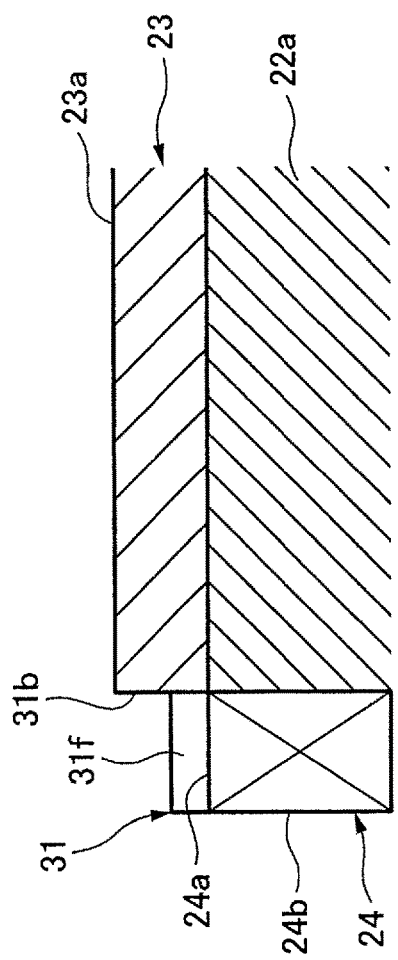
FIG. 7B is a cross-sectional view seen from arrows D-D in FIG. 7A.
Figure 7A:
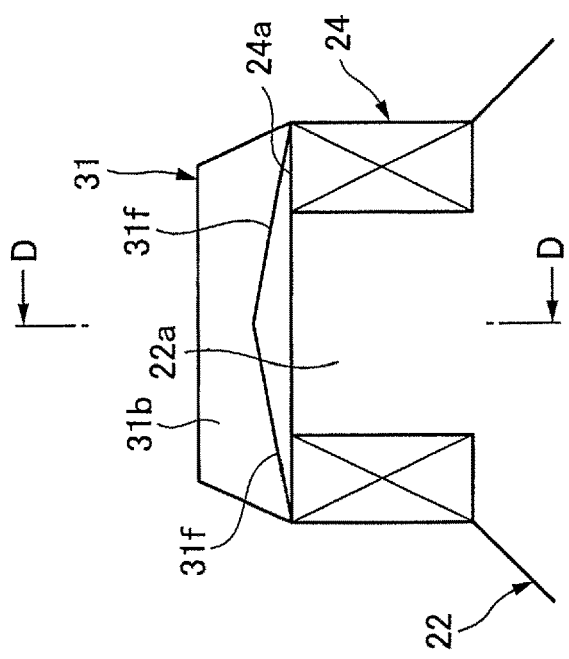
FIG. 7A is a front view of a restraining part on which inclined surfaces are formed.

Further, as illustrated in FIG. 7A and FIG. 7B, two inclined surfaces 31f may be formed to be adjacent to the step 31b at the restraining part 31. Each of these inclined surfaces 31f is gradually inclined radially inward as extending from the inside in the width direction toward the outside in the width direction, and the inclined surfaces 31f are adjacent to each other in the width direction. With this, the two inclined surfaces 31f form a triangle as a whole.

REFERENCE SIGNS LIST 1 dynamo-electric machine
11 stator core
11a axial end surface
11b inner circumferential surface
12 salient pole rotor
21 rotary shaft
22 magnetic pole core
22a protrusion
23 magnetic pole head
23a radially outside end surface
24 field winding
24a winding-axis-direction outside end surface
24b coil end
25 magnetic pole
31 restraining part
31a inclined surface
31b step
31c inclined surface
31d flat surface
32e protruding surface
32f inclined surface

The invention claimed is:

1. A dynamo-electric machine characterized in that the dynamo-electric machine comprises:
a cylindrical stator core;
a magnetic pole core which is rotatably supported radially inside of the stator core, and on which a plurality of protrusions protruding radially outward are arranged along a circumferential direction;
field windings each wound around a side peripheral surface of a corresponding one of the protrusions; and
magnetic pole heads each of which is provided on a top surface of a corresponding one of the protrusions and is in contact with a winding-axis-direction outside end surface of a corresponding one of the field windings to restrain the field winding,
each of the magnetic pole heads has restraining parts formed integrally with the magnetic pole at both axial ends thereof, each of the restraining parts being in contact with the winding-axis-direction outside end surface at a coil end of the field winding to restrain the coil end, and
the restraining parts are arranged axially outside of both axial end surfaces of the stator core, each of the restraining parts having
an inclined surface which is arranged radially inside of a radially outside end surface of the magnetic pole head, the radially outside end surface axially facing an inner circumferential surface of the stator core, and which is gradually inclined radially inward as extending axially outward, and
a step radially connecting an axially outside end of the radially outside end surface and an axially inside end of the inclined surface.

2. The dynamo-electric machine according to claim 1, characterized in that
the protrusion and the magnetic pole head are separate members.

3. The dynamo-electric machine according to claim 1, characterized in that
the step is formed in an entire area in a width direction of the restraining part.

4. The dynamo-electric machine according to claim 2, characterized in that
the step is formed in an entire area in a width direction of the restraining part.

5. A dynamo-electric machine characterized in that the dynamo-electric machine comprises:
a cylindrical stator core;
a magnetic pole core which is rotatably supported radially inside of the stator core, and on which a plurality of protrusions protruding radially outward are arranged along a circumferential direction;
field windings each wound around a side peripheral surface of a corresponding one of the protrusions; and
magnetic pole heads each of which is provided on a top surface of a corresponding one of the protrusions and is in contact with a winding-axis-direction outside end surface of a corresponding one of the field windings to restrain the field winding,
each of the magnetic pole heads has restraining parts formed integrally with the magnetic pole at both axial ends thereof, each of the restraining parts being in contact with the winding-axis-direction outside end surface at a coil end of the field winding to restrain the coil end, and
the restraining parts are arranged axially inside of both axial end surfaces of the stator core, each of the restraining parts having
an inclined surface which is arranged radially inside of a radially outside end surface of the magnetic pole head, the radially outside end surface axially facing an inner circumferential surface of the stator core, and which is gradually inclined radially inward as extending axially outward, and a step radially connecting an axially outside end of the radially outside end surface and an axially inside end of the inclined surface.

6. The dynamo-electric machine according to claim 5, characterized in that the protrusion and the magnetic pole head are separate members.

7. The dynamo-electric machine according to claim 5, characterized in that the step is formed in an entire area in a width direction of the restraining part.

8. The dynamo-electric machine according to claim 6, characterized in that the step is formed in an entire area in a width direction of the restraining part.

* * * * *